(12) United States Patent
Jeong et al.

(10) Patent No.: US 8,646,617 B2
(45) Date of Patent: Feb. 11, 2014

(54) REVERSE OSMOSIS MEMBRANE HAVING GOOD ANTIFOULING PROPERTIES AND METHOD OF MANUFACTURING THE SAME

(71) Applicant: LG Chem, Ltd., Seoul (KR)

(72) Inventors: Seung-Pyo Jeong, Daejeon (KR); Chong-Kyu Shin, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 13/951,239

(22) Filed: Jul. 25, 2013

(65) Prior Publication Data

US 2013/0306550 A1 Nov. 21, 2013

Related U.S. Application Data

(63) Continuation of application No. PCT/KR2013/000048, filed on Jan. 4, 2013.

(30) Foreign Application Priority Data

Jan. 5, 2012 (KR) .......... 10-2012-0001513
Jan. 3, 2013 (KR) .......... 10-2013-0000696

(51) Int. Cl.
  *B01D 39/00* (2006.01)
  *B01D 39/14* (2006.01)
  *B01D 67/00* (2006.01)
  *B05D 5/00* (2006.01)
  *B01J 49/00* (2006.01)

(52) U.S. Cl.
  USPC .......... 210/500.38; 210/490; 210/500.35; 264/48; 521/27; 427/244

(58) Field of Classification Search
  USPC .......... 210/500.38, 490, 500.35; 264/48; 427/244; 521/27
  See application file for complete search history.

(56) References Cited

U.S. PATENT DOCUMENTS

| | | | |
|---|---|---|---|
| 4,797,187 A * | 1/1989 | Davis et al. | 427/58 |
| 4,839,203 A * | 6/1989 | Davis et al. | 427/244 |
| 5,039,421 A * | 8/1991 | Linder et al. | 210/651 |
| 6,551,536 B1 | 4/2003 | Kwak et al. | |
| 7,087,269 B2 | 8/2006 | Lee et al. | |
| 7,198,880 B2 * | 4/2007 | Sasaki et al. | 430/270.1 |
| 8,426,487 B2 * | 4/2013 | Shin et al. | 522/160 |
| 2009/0308804 A1 | 12/2009 | Cohen et al. | |
| 2012/0197413 A1 * | 8/2012 | Kyomoto et al. | 623/22.32 |
| 2012/0273421 A1 * | 11/2012 | Perry et al. | 210/651 |

FOREIGN PATENT DOCUMENTS

| | | |
|---|---|---|
| KR | 10-2002-0001035 A | 1/2002 |
| KR | 10-2003-0089842 A | 11/2003 |
| KR | 10-0781625 B1 | 12/2007 |
| KR | 10-2010-0083700 A | 7/2010 |
| KR | 10-2011-0011842 A | 2/2011 |

* cited by examiner

*Primary Examiner* — Ana Fortuna
(74) *Attorney, Agent, or Firm* — McKenna Long & Aldridge, LLP

(57) ABSTRACT

A reverse osmosis membrane includes a porous support, a polyamide active layer formed on the porous support, and a coating layer including a copolymer including an amphoteric ionic compound and glycidyl (meth)acrylate. The coating layer makes a chemical bond with the polyamide active layer. A method of manufacturing the reverse osmosis membrane also is disclosed.

16 Claims, No Drawings

REVERSE OSMOSIS MEMBRANE HAVING GOOD ANTIFOULING PROPERTIES AND METHOD OF MANUFACTURING THE SAME

This application is a Continuation Bypass Application of International Patent Application No. PCT/KR2013/000048, filed Jan. 4, 2013, and claims the benefit of Korean Patent Application Nos. 10-2012-0001513 filed on Jan. 5, 2012, and 10-2013-0000696 filed on Jan. 3, 2013, in the Korean Intellectual Property Office, the disclosures of which are incorporated herein by reference.

BACKGROUND OF THE INVENTION

1. Field of the Invention

The present invention relates to a reverse osmosis membrane and a method of manufacturing the same, and more particularly, to a reverse osmosis membrane including a coating layer including a copolymer of an amphoteric ionic compound and glycidyl methacrylate on the surface of the membrane and having good antifouling properties, and a method of manufacturing the same.

2. Description of the Related Art

The phenomenon of a solvent moving between two isolated solutions through a semi-permeable membrane from a solution including a lower concentration of a solute to another solution, including a higher concentration of a solute, is known as an osmotic phenomenon. In this case, the pressure acting on the solution including the higher concentration of the solute due to the movement of the solvent is known as an osmotic pressure. When external pressure, having a level higher than the osmotic pressure is applied, the solvent may move toward the solution including the lower concentration of the solute. This phenomenon is known as a reverse osmosis. Various salts and organic materials may be separated by the semi-permeable membrane by using a pressure gradient as a driving force by utilizing the principle of reverse osmosis. A reverse osmosis separation membrane using the reverse osmosis phenomenon may be used for separating molecule scale materials and removing salts from a brine or seawater to supply water available for domestic, commercial and industrial use.

Typical examples of the reverse osmosis separation membrane may include a polyamide reverse osmosis separation membrane. The polyamide reverse osmosis separation membrane may be manufactured by forming a polyamide active layer on a minute, porous support. More particularly, the minute, porous support may be formed by forming a polysulfone layer on a non-woven fabric to form the minute, porous support, forming an m-phenylenediamine (mPD) layer by dipping the minute, porous support into an aqueous mPD solution, and dipping the support into a trimesoyl chloride (TMC) organic solvent to make a contact with the mPD layer and TMC to conduct interfacial polymerization to form a polyamide layer.

Recently, in order to increase the durability and antifouling properties of a reverse osmosis membrane, for improving the performance thereof, a method of graft-copolymerizing a vinyl monomer on the surface of a polyamide active layer (U.S. Patent Publication No. 20090308804) and a method of introducing inorganic particles such as $TiO_2$ to a polyamide active layer (U.S. Pat. No. 6,551,536), etc. have been suggested. However, according to the above-described methods, obtainable effects therefrom are trivial, or the thickness of the reverse osmosis membrane may be increased due to multiple laminated coating layers. Thus, a water purifying function may be deteriorated, and the manufacturing process may be complicated.

SUMMARY OF THE INVENTION

An aspect of the present invention provides a reverse osmosis membrane having good antifouling properties and a relative thinness, while maintaining a water purifying function including salt rejection and permeation flux.

According to an aspect of the present invention, there is provided a reverse osmosis membrane including a porous support, a polyamide active layer formed on the porous support, and a coating layer including a copolymer including an amphoteric ionic compound and glycidyl (meth)acrylate. The coating layer makes a chemical bond with the polyamide active layer.

In this case, the amphoteric ionic compound may be a compound represented by following Chemical Formula 1 or a compound represented by following Chemical Formula 2.

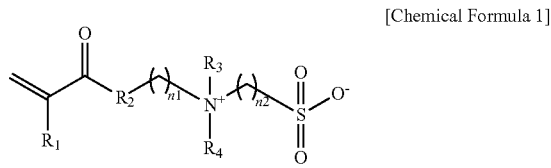

[Chemical Formula 1]

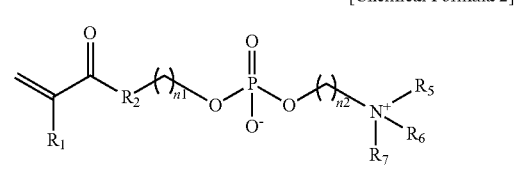

[Chemical Formula 2]

In Chemical Formulae 1 and 2, $R_1$ represents H or a $C_{1-10}$ alkyl group, preferably H or methyl, $R_2$ represents O, NH, S or PH, each of $R_3$, $R_4$, $R_5$, $R_6$ and $R_7$ independently represents hydrogen or a $C_{1-5}$ alkyl group, preferably a $C_{1-3}$ alkyl group, and most preferably, methyl, $n_1$ represents an integer of 1 to 8, preferably, 2 to 8, and $n_2$ represents an integer of 1 to 4, preferably, 2 to 4.

The coating layer may include a copolymer including the amphoteric ionic compound, glycidyl (meth)acrylate, poly(ethylene glycol) methacrylate and poly(ethylene glycol) dimethacrylate.

According to another embodiment of the present invention, there is provided a method of manufacturing a reverse osmosis membrane, including treating a porous support including a polyamide active layer with an aqueous solution including a copolymer including an amphoteric ionic compound and glycidyl (meth)acrylate.

In this case, the aqueous solution may include the copolymer by 0.0001 wt % to 10 wt %, and the treating may be conducted by a dipping process.

DETAILED DESCRIPTION OF THE INVENTION

Hereinafter, Embodiments of the present invention will be described in detail. The invention may, however, be embodied in many different forms and should not be construed as being limited to the embodiments set forth herein. Rather, these embodiments are provided so that this disclosure will be thorough and complete, and will fully convey the scope of the invention to those skilled in the art.

The inventors of the present invention have undertaken research into developing a reverse osmosis membrane having a good antifouling properties and durability without deteriorating a water purifying properties, and have accomplished the present invention by forming a coating layer including an amphoteric ionic compound and glycidyl (meth)acrylate on a polyamide active layer.

A reverse osmosis membrane in exemplary embodiments may include a porous support (1), a polyamide active layer (2), and a coating layer (3).

As the porous support (1), a non-woven fabric including a coating layer of a polymer material formed thereon may be used. The polymer material may include, for example, polysulfone, polyethersulfone, polycarbonate, polyethylene oxide, polyimide, polyetherimide, polyether ether ketone, polypropylene, polymethylpentene, polymethyl chloride, polyvinylidene fluoride, etc., without limitation. Particularly, polysulfone may be preferably used.

The polyamide active layer (2) may be formed by an interfacial polymerization of an amine compound and an acyl halide compound. In this case, the amine compound may include, for example, m-phenylenediamine, p-phenylenediamine, 1,3,6-benzenetriamine, 4-chloro-1,3-phenylenediamine, 6-chloro-1,3-phenylenediamine, 3-chloro-1,4-phenylenediamine, or a mixture thereof, without limitation. In addition, the acyl halide compound may include, for example, trimesoyl chloride, isophthaloyl chloride, terephthaloyl chloride, or a mixture thereof, without limitation.

The coating layer (3) is characterized in including an amphoteric ionic compound and glycidyl (meth)acrylate.

In this case, the amphoteric ionic compound is electrically neutral, however, includes both of a cationically charged group and an anionically charged group, and is used to improve hydrophilicity of the surface of the reverse osmosis membrane. Through including the amphoteric ionic compound in the coating layer on the surface of the reverse osmosis membrane, the surface energy of the reverse osmosis membrane may be increased by the charged groups present in the amphoteric ionic compound to improve hydrophilicity. The increase of hydrophilicity due to the introduction of the amphoteric ionic compound may be remarkably higher than the hydrophilicity of the polyamide active layer itself. Thus, the water permeability of the reverse osmosis membrane may be improved, and the adsorption of a fouling material, particularly, an organic bio material, onto the surface of the reverse osmosis membrane may be prevented to improve an antifouling effect.

The amphoteric ionic compound used in the present inventive concept may include any compounds including a cationically charged group and an anionically charged group in one molecule, without limitation. In this case, the cationically charged group may include an ammonium group, a phosphonium group, etc., and the anionically charged group may include a sulfonic acid group, a phosphate group, an acetate group, etc.

Preferably, the amphoteric ionic compound may be a compound represented by the following Chemical Formula 1 or a compound represented by the following Chemical Formula 2.

[Chemical Formula 1]

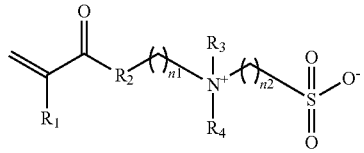

[Chemical Formula 2]

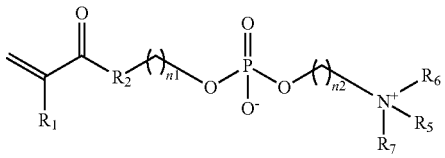

In Chemical Formulae 1 and 2, $R_1$ represents H or a $C_{1-10}$ alkyl group, preferably, H or methyl, $R_2$ represents O, NH, S or PH, each of $R_3$, $R_4$, $R_5$, $R_6$ and $R_7$ independently represents hydrogen or a $C_{1-5}$ alkyl group, preferably, a $C_{1-3}$ alkyl group, and most preferably, methyl, $n_1$ represents an integer of 1 to 8, preferably, an integer of 2 to 8, and $n_2$ represents an integer of 1 to 4, preferably, an integer of 2 to 4.

More particularly, the amphoteric ionic compound may include, without limitation, at least one selected from the group consisting of [2-(methacrylolyloxy)ethyl]-dimethyl-(2-sulfoethyl)-ammonium hydroxide, [2-(methacrylolyloxy)ethyl]-dimethyl-(3-sulfopropyl)-ammonium hydroxide, [2-(methacrylolyloxy)ethyl]-dimethyl-(4-sulfobutyl)-ammonium hydroxide, [2-(methacrylolyloxy)ethyl]-dimethyl-(5-sulfopentyl)-ammonium hydroxide, [2-(acryloyloxy)ethyl]-dimethyl-(2-sulfoethyl)-ammonium hydroxide, [2-(acryloyloxy)ethyl]-dimethyl-(3-sulfopropyl)-ammonium hydroxide, [2-(acryloyloxy)ethyl]-dimethyl-(4-sulfobutyl)-ammonium hydroxide, [2-(acryloyloxy)ethyl]-dimethyl-(5-sulfopentyl)-ammonium hydroxide, [3-(methacrylolyloxy)propyl]-dimethyl-(2-sulfoethyl)-ammonium hydroxide, [3-(methacrylolyloxy)propyl]-dimethyl-(3-sulfopropyl)-ammonium hydroxide, [3-(methacrylolyloxy)propyl]-dimethyl-(4-sulfobutyl)-ammonium hydroxide, [3-(methacrylolyloxy)propyl]-dimethyl-(5-sulfopentyl)-ammonium hydroxide, [3-(acryloyloxy)propyl]-dimethyl-(2-sulfoethyl)-ammonium hydroxide, [3-(acryloyloxy)propyl]-dimethyl-(3-sulfopropyl)-ammonium hydroxide, [3-(acryloyloxy)propyl]-dimethyl-(4-sulfobutyl)-ammonium hydroxide, [3-(acryloyloxy)propyl]-dimethyl-(5-sulfopentyl)-ammonium hydroxide, [4-(methacrylolyloxy)butyl]-dimethyl-(2-sulfoethyl)-ammonium hydroxide, [4-(methacrylolyloxy)butyl]-dimethyl-(3-sulfopropyl)-ammonium hydroxide, [4-(methacrylolyloxy)butyl]-dimethyl-(4-sulfobutyl)-ammonium hydroxide, [4-(methacrylolyloxy)butyl]-dimethyl-(5-sulfopentyl)-ammonium hydroxide, [4-(methacrylolyloxy)butyl]-dimethyl-(6-sulfohexyl)-ammonium hydroxide, [4-(acryloyloxy)butyl]-dimethyl-(2-sulfoethyl)-ammonium hydroxide, [4-(acryloyloxy)butyl]-dimethyl-(3-sulfopropyl)-ammonium hydroxide, [4-(acryloyloxy)butyl]-dimethyl-(4-sulfobutyl)-ammonium hydroxide, [4-(acryloyloxy)butyl]-dimethyl-(5-sulfopentyl)-ammonium hydroxide, [4-(acryloyloxy)butyl]-dimethyl-(6-sulfohexyl)-ammonium hydroxide, [2-(methacrylolylamino)ethyl]-dimethyl-(2-sulfoethyl)-ammonium hydroxide, [2-

(methacrylolylamino)ethyl]-dimethyl-(3-sulfopropyl)-ammonium hydroxide, [2-(methacrylolylamino)ethyl]-dimethyl-(4-sulfobutyl)-ammonium hydroxide, [2-(methacrylolylamino)ethyl]-dimethyl-(5-sulfopentyl)-ammonium hydroxide, [2-(acryloylamino)ethyl]-dimethyl-(2-sulfoethyl)-ammonium hydroxide, [2-(acryloylamino)ethyl]-dimethyl-(3-sulfopropyl)-ammonium hydroxide, [2-(acryloylamino)ethyl]-dimethyl-(4-sulfobutyl)-ammonium hydroxide, [2-(acryloylamino)ethyl]-dimethyl-(5-sulfopentyl)-ammonium hydroxide, [3-(methacrylolylamino)propyl]-dimethyl-(2-sulfoethyl)-ammonium hydroxide, [3-(methacrylolylamino)propyl]-dimethyl-(3-sulfopropyl)-ammonium hydroxide, [3-(methacrylolylamino)propyl]-dimethyl-(4-sulfobutyl)-ammonium hydroxide, [3-(methacrylolylamino)propyl]-dimethyl-(5-sulfopentyl)-ammonium hydroxide, [3-(acryloylamino)propyl]-dimethyl-(2-sulfoethyl)-ammonium hydroxide, [3-(acryloylamino)propyl]-dimethyl-(3-sulfopropyl)-ammonium hydroxide, [3-(acryloylamino)propyl]-dimethyl-(4-sulfobutyl)-ammonium hydroxide, [3-(acryloylamino)propyl]-dimethyl-(5-sulfopentyl)-ammonium hydroxide, [4-(methacrylolylamino)butyl]-dimethyl-(2-sulfoethyl)-ammonium hydroxide, [4-(methacrylolylamino)butyl]-dimethyl-(3-sulfopropyl)-ammonium hydroxide, [4-(methacrylolylamino)butyl]-dimethyl-(4-sulfobutyl)-ammonium hydroxide, [4-(methacrylolylamino)butyl]-dimethyl-(5-sulfopentyl)-ammonium hydroxide, [4-(methacrylolylamino)butyl]-dimethyl-(6-sulfohexyl)-ammonium hydroxide, [4-(acryloylamino)butyl]-dimethyl-(2-sulfoethyl)-ammonium hydroxide, [4-(acryloylamino)butyl]-dimethyl-(3-sulfopropyl)-ammonium hydroxide, [4-(acryloylamino)butyl]-dimethyl-(4-sulfobutyl)-ammonium hydroxide, [4-(acryloylamino)butyl]-dimethyl-(5-sulfopentyl)-ammonium hydroxide, [4-(acryloylamino)butyl]-dimethyl-(6-sulfohexyl)-ammonium hydroxide, 2-(methacrylolyloxy)ethyl 2-(trimethylammonio)ethyl phosphate, 3-(methacrylolyloxy)propyl 2-(trimethylammonio)ethyl phosphate, 4-(methacrylolyloxy)butyl 2-(trimethylammonio)ethyl phosphate, 5-(methacrylolyloxy)pentyl 2-(trimethylammonio)ethyl phosphate, 6-(methacrylolyloxy)hexyl 2-(trimethylammonio)ethyl phosphate, 7-(methacrylolyloxy)heptyl 2-(trimethylammonio)ethyl phosphate, 8-(methacrylolyloxy)octyl 2-(trimethylammonio)ethyl phosphate, 2-(methacrylolylamino)ethyl 2-(trimethylammonio)ethyl phosphate, 3-(methacrylolylamino)propyl 2-(trimethylammonio)ethyl phosphate, 4-(methacrylolylamino)butyl 2-(trimethylammonio)ethyl phosphate, 5-(methacrylolylamino)pentyl 2-(trimethylammonio)ethyl phosphate, 6-(methacrylolylamino)hexyl 2-(trimethylammonio)ethyl phosphate, 7-(methacrylolylamino)heptyl 2-(trimethylammonio)ethyl phosphate, 8-(methacrylolylamino)octyl 2-(trimethylammonio)ethyl phosphate, 2-(acryloyloxy)ethyl 2-(trimethylammonio)ethyl phosphate, 3-(acryloyloxy)propyl 2-(trimethylammonio)ethyl phosphate, 4-(acryloyloxy)butyl 2-(trimethylammonio)ethyl phosphate, 5-(acryloyloxy)pentyl 2-(trimethylammonio)ethyl phosphate, 6-(acryloyloxy)hexyl 2-(trimethylammonio)ethyl phosphate, 7-(acryloyloxy)heptyl 2-(trimethylammonio)ethyl phosphate, 8-(acryloyloxy)octyl 2-(trimethylammonio)ethyl phosphate, 2-(methacrylolyloxy)ethyl 3-(trimethylammonio)propyl phosphate, 3-(methacrylolyloxy)propyl 3-(trimethylammonio)propyl phosphate, 4-(methacrylolyloxy)butyl 3-(trimethylammonio)propyl phosphate, 5-(methacrylolyloxy)pentyl 3-(trimethylammonio)propyl phosphate, 6-(methacrylolyloxy)hexyl 3-(trimethylammonio)propyl phosphate, 7-(methacrylolyloxy)heptyl 3-(trimethylammonio)propyl phosphate, 8-(methacrylolyloxy)octyl 3-(trimethylammonio)propyl phosphate, 2-(methacrylolylamino)ethyl 3-(trimethylammonio)propyl phosphate, 3-(methacrylolylamino)propyl 3-(trimethylammonio)propyl phosphate, 4-(methacrylolylamino)butyl 3-(trimethylammonio)propyl phosphate, 5-(methacrylolylamino)pentyl 3-(trimethylammonio)propyl phosphate, 6-(methacrylolylamino)hexyl 3-(trimethylammonio)propyl phosphate, 7-(methacrylolylamino)heptyl 3-(trimethylammonio)propyl phosphate, 8-(methacrylolylamino)octyl 3-(trimethylammonio)propyl phosphate, 2-(acryloyloxy)ethyl 3-(trimethylammonio)propyl phosphate, 3-(acryloyloxy)propyl 3-(trimethylammonio)propyl phosphate, 4-(acryloyloxy)butyl 3-(trimethylammonio)propyl phosphate, 5-(acryloyloxy)pentyl 3-(trimethylammonio)propyl phosphate, 6-(acryloyloxy)hexyl 3-(trimethylammonio)propyl phosphate, 7-(acryloyloxy)heptyl 3-(trimethylammonio)propyl phosphate, 8-(acryloyloxy)octyl 3-(trimethylammonio)propyl phosphate, 2-(methacrylolyloxy)ethyl 4-(trimethylammonio)butyl phosphate, 3-(methacrylolyloxy)propyl 4-(trimethylammonio)butyl phosphate, 4-(methacrylolyloxy)butyl 4-(trimethylammonio)butyl phosphate, 5-(methacrylolyloxy)pentyl 4-(trimethylammonio)butyl phosphate, 6-(methacrylolyloxy)hexyl 4-(trimethylammonio)butyl phosphate, 7-(methacrylolyloxy)heptyl 4-(trimethylammonio)butyl phosphate, 8-(methacrylolyloxy)octyl 4-(trimethylammonio)butyl phosphate, 2-(methacrylolylamino)ethyl 4-(trimethylammonio)butyl phosphate, 3-(methacrylolylamino)propyl 4-(trimethylammonio)butyl phosphate, 4-(methacrylolylamino)butyl 4-(trimethylammonio)butyl phosphate, 5-(methacrylolylamino)pentyl 4-(trimethylammonio)butyl phosphate, 6-(methacrylolylamino)hexyl 4-(trimethylammonio)butyl phosphate, 7-(methacrylolylamino)heptyl 4-(trimethylammonio)butyl phosphate, 8-(methacrylolylamino)octyl 4-(trimethylammonio)butyl phosphate, 2-(acryloyloxy)ethyl 4-(trimethylammonio)butyl phosphate, 3-(acryloyloxy)propyl 4-(trimethylammonio)butyl phosphate, 4-(acryloyloxy)butyl 4-(trimethylammonio)butyl phosphate, 5-(acryloyloxy)pentyl 4-(trimethylammonio)butyl phosphate, 6-(acryloyloxy)hexyl 4-(trimethylammonio)butyl phosphate, 7-(acryloyloxy)heptyl 4-(trimethylammonio)butyl phosphate, and 8-(acryloyloxy)octyl 4-(trimethylammonio)butyl phosphate.

The glycidyl (meth)acrylate is included in the coating layer for making a chemical bond with the polyamide coating layer, and includes glycidyl methacrylate or glycidyl acrylate, and more preferably includes glycidyl methacrylate.

The amphoteric ionic compound and the glycidyl (meth)acrylate are preferably included as copolymers. In this case, the copolymers may be formed by polymerizing an amphoteric ionic compound monomer with a glycidyl (meth)acrylate monomer in the presence of an initiator. The amphoteric ionic compound and the glycidyl (meth)acrylate are preferably used by an equivalent ratio of 0.01 to 7:0.05 to 3. When the equivalent ratio of the amphoteric ionic compound and the glycidyl (meth)acrylate satisfies the above numerical range, the binding force with the polyamide active layer, the physical properties such as ultra hydrophilicity and an antifouling properties of the coating layer may be good.

The copolymer in exemplary embodiments may additionally include poly(ethylene glycol) (meth)acrylate compound along with the amphoteric ionic compound and the glycidyl (meth)acrylate. The poly(ethylene glycol) (meth)acrylate compound may include, without limitation, poly(ethylene glycol) methacrylate, poly(ethylene glycol) dimethacrylate, poly(ethylene glycol) methyl ether methacrylate including 3 to 200 chains of ethylene glycol, and a combination thereof. Preferably, both poly(ethylene glycol) methacrylate and poly (ethylene glycol) dimethacrylate may be used together. When poly(ethylene glycol) (meth)acrylate compound is added, the antifouling properties may be maximized.

Most preferably, the coating layer in exemplary embodiments may include a copolymer including the amphoteric ionic compound, glycidyl (meth)acrylate, poly(ethylene glycol) methacrylate and poly(ethylene glycol) dimethacrylate.

The copolymer may be preferably prepared by reacting the amphoteric ionic compound, glycidyl (meth)acrylate, poly(ethylene glycol) methacrylate and poly(ethylene glycol) dimethacrylate by an equivalent ratio of 0.1 to 7.5:0.01 to 5:0.1 to 5:0.01 to 1. When the equivalent ratio of each component satisfies the above numerical range, the binding force with the polyamide active layer, the ultra hydrophilicity and the antifouling properties of the coating layer may be good.

When the coating layer including the copolymer including the amphoteric ionic compound and the glycidyl (meth)acrylate is formed on the polyamide active layer, the adsorption of a fouling material on the surface of the reverse osmosis membrane may be prevented due to the hydrophilicity of the coating layer. Thus, good antifouling properties may be obtainable. Particularly, the reverse osmosis membrane in accordance with the present inventive concept may have a good preventing effect on bio-fouling due to an organic material.

In accordance with experiments by the present inventors, the reverse osmosis membrane including the coating layer including the copolymer including the amphoteric ionic compound and the glycidyl (meth)acrylate may have an equivalent or better performance as compared to a common reverse osmosis membrane. An initial level of salt rejection of 97% or over, and an initial flux is 25 gallon/ft²·day or more, for the reverse osmosis membrane, in exemplary embodiments. After two hours from adding a fouling material, casein, the level of salt rejection is 97% or over, and the flux is 23 to 35 gallon/ft²·day or more for the reverse osmosis membrane in exemplary embodiments. Thus, a water purifying function may only be lightly deteriorated, and the antifouling properties of the reverse osmosis membrane in accordance with exemplary embodiments are good, when comparing with those of the common reverse osmosis membrane.

Hereinafter, a method of manufacturing a reverse osmosis membrane in accordance with the present inventive concept will be explained.

The reverse osmosis membrane in accordance with exemplary embodiments may be manufactured by forming a coating layer by treating a porous support including a polyamide active layer with an aqueous solution including an amphoteric ionic compound and glycidyl (meth)acrylate.

The forming method of the polyamide active layer on the porous support may not be limited to a certain method, however, may be conducted by methods of manufacturing a reverse osmosis membrane well known in the art. For example, a polyamide active layer may be formed by dipping a porous support into an aqueous m-phenylenediamine (mPD) solution to form an mPD layer, and by dipping the porous support again into a trimesoyl chloride (TMC) organic solvent to make a contact of the mPD layer with TMC to conduct an interfacial polymerization. In addition, the polyamide active layer may also be formed by means of a spraying or a coating method instead of the dipping method.

The treatment of the porous support including the polyamide active layer formed thereon with an aqueous solution including a copolymer including the amphoteric ionic compound and the glycidyl (meth)acrylate may be conducted by, for example, dipping the porous support including the polyamide active layer into the aqueous solution including the copolymer. In this case, the amount of the copolymer in the aqueous solution may be 0.0001 to 10 wt %, preferably, 0.01 to 5 wt %, and most preferably, 0.5 to 3 wt %. When the amount of the copolymer in the aqueous solution satisfies the above range, the antifouling properties and the water purifying function may be good.

The dipping time may be from about 1 minute to 5 hours, and more preferably, from about 1 minute to 3 hours. When the dipping time is shorter than 1 minute, the coating layer may be insufficiently formed. When the dipping time exceeds 5 hours, the thickness of the coating layer may be too large, to thereby decrease the permeation flux of the reverse osmosis membrane.

After forming the coating layer on the polyamide active layer through the dipping process, a drying process may be conducted at about 25° C. to 65° C. for about 1 to 30 minutes to improve the adhesiveness between the coating layer and the polyamide active layer.

The amphoteric ionic compound may be a compound represented by the following Chemical Formula 1 or a compound represented by the following Chemical Formula 2.

[Chemical Formula 1]

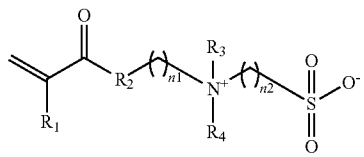

[Chemical Formula 2]

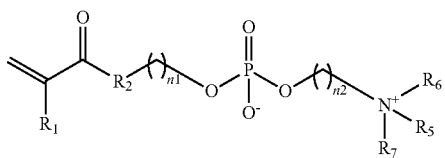

In Chemical Formulae 1 and 2, $R_1$ represents H or a $C_{1-10}$ alkyl group, preferably, H or methyl.

$R_2$ represents O, NH, S or PH, each of $R_3$, $R_4$, $R_5$, $R_6$ and $R_7$ independently represents hydrogen or a $C_{1-5}$ alkyl group, preferably, a $C_{1-3}$ alkyl group, most preferably, methyl, $n_1$ represents an integer of 1 to 8, preferably, an integer of 2 to 8, and $n_2$ represents an integer of 1 to 4, preferably, an integer of 2 to 4.

Particularly, the amphoteric ionic compound may include, without limitation, at least one selected from the group consisting of [2-(methacrylolyloxy)ethyl]-dimethyl-(2-sulfoethyl)-ammonium hydroxide, [2-(methacrylolyloxy)ethyl]-dimethyl-(3-sulfopropyl)-ammonium hydroxide, [2-(methacrylolyloxy)ethyl]-dimethyl-(4-sulfobutyl)-ammonium hydroxide, [2-(methacrylolyloxy)ethyl]-dimethyl-(5-sulfopentyl)-ammonium hydroxide, [2-(acryloyloxy)ethyl]-dimethyl-(2-sulfoethyl)-ammonium hydroxide, [2-(acryloyloxy)ethyl]-dimethyl-(3-sulfopropyl)-ammonium hydroxide, [2-(acryloyloxy)ethyl]-dimethyl-(4-sulfobutyl)-ammonium hydroxide, [2-(acryloyloxy)ethyl]-dimethyl-(5-sulfopentyl)-ammonium hydroxide, [3-(methacrylolyloxy)propyl]-dimethyl-(2-sulfoethyl)-ammonium hydroxide, [3-(methacrylolyloxy)propyl]-dimethyl-(3-sulfopropyl)-ammonium hydroxide, [3-(methacrylolyloxy)propyl]-dimethyl-(4-sulfobutyl)- ammonium hydroxide, [3-(methacrylolyloxy)propyl]-dimethyl-(5-sulfopentyl)-ammonium hydroxide, [3-(acryloyloxy)propyl]-dimethyl-(2-sulfoethyl)-ammonium hydroxide, [3-(acryloyloxy)propyl]-dimethyl-(3-sulfopropyl)-ammonium hydroxide, [3-(acryloyloxy)propyl]-dimethyl-(4-sulfobutyl)-ammonium hydroxide, [3-(acryloyloxy)propyl]-dimethyl-(5-sulfopentyl)-ammonium hydroxide, [4-(methacrylolyloxy)butyl]-dimethyl-(2-sulfoethyl)-ammonium hydroxide, [4-(methacrylolyloxy)butyl]-dimethyl-(3-sulfopropyl)-ammonium hydroxide, [4-(methacrylolyloxy)butyl]-dimethyl-(4-sulfobutyl)-ammonium hydroxide, [4-(methacrylolyloxy)butyl]-dimethyl-(5-sulfopentyl)-ammonium hydroxide, [4-(methacrylolyloxy)butyl]-dimethyl-(6-sulfohexyl)-ammonium hydroxide, [4-(acryloyloxy)butyl]-dimethyl-(2-sulfoethyl)-ammonium hydroxide, [4-(acryloyloxy)butyl]-dimethyl-(3-sulfopropyl)-ammonium hydroxide, [4-(acryloyloxy)butyl]-dimethyl-(4-sulfobutyl)-ammonium hydroxide, [4-(acryloyloxy)butyl]-dimethyl-(5-sulfopentyl)-ammonium hydroxide, [4-(acryloyloxy)butyl]-dimethyl-(6-sulfohexyl)-ammonium hydroxide, [2-(methacrylolylamino)ethyl]-dimethyl-(2-sulfoethyl)-ammonium hydroxide, [2-(methacrylolylamino)ethyl]-dimethyl-(3-sulfopropyl)-ammonium hydroxide, [2-(methacrylolylamino)ethyl]-dimethyl-(4-sulfobutyl)-ammonium hydroxide, [2-(methacrylolylamino)ethyl]-dimethyl-(5-sulfopentyl)-ammonium hydroxide, [2-(acryloylamino)ethyl]-dimethyl-(2-sulfoethyl)-ammonium hydroxide, [2-(acryloylamino)ethyl]-dimethyl-(3-sulfopropyl)-ammonium hydroxide, [2-(acryloylamino)ethyl]-dimethyl-(4-sulfobutyl)-ammonium hydroxide, [2-(acryloylamino)ethyl]-dimethyl-(5-sulfopentyl)-ammonium hydroxide, [3-(methacrylolylamino)propyl]-dimethyl-(2-sulfoethyl)-ammonium hydroxide, [3-(methacrylolylamino)propyl]-dimethyl-(3-sulfopropyl)-ammonium hydroxide, [3-(methacrylolylamino)propyl]-dimethyl-(4-sulfobutyl)-ammonium hydroxide, [3-(methacrylolylamino)propyl]-dimethyl-(5-sulfopentyl)-ammonium hydroxide, [3-(acryloylamino)propyl]-dimethyl-(2-sulfoethyl)-ammonium hydroxide, [3-(acryloylamino)propyl]-dimethyl-(3-sulfopropyl)-ammonium hydroxide, [3-(acryloylamino)propyl]-dimethyl-(4-sulfobutyl)-ammonium hydroxide, [3-(acryloylamino)propyl]-dimethyl-(5-sulfopentyl)-ammonium hydroxide, [4-(methacrylolylamino)butyl]-dimethyl-(2-sulfoethyl)-ammonium hydroxide, [4-(methacrylolylamino)butyl]-dimethyl-(3-sulfopropyl)-ammonium hydroxide, [4-(methacrylolylamino)butyl]-dimethyl-(4-sulfobutyl)-ammonium hydroxide, [4-(methacrylolylamino)butyl]-dimethyl-(5-sulfopentyl)-ammonium hydroxide, [4-(methacrylolylamino)butyl]-dimethyl-(6-sulfohexyl)-ammonium hydroxide, [4-(acryloylamino)butyl]-dimethyl-(2-sulfoethyl)-ammonium hydroxide, [4-(acryloylamino)butyl]-dimethyl-(3-sulfopropyl)-ammonium hydroxide, [4-(acryloylamino)butyl]-dimethyl-(4-sulfobutyl)-ammonium hydroxide, [4-(acryloylamino)butyl]-dimethyl-(5-sulfopentyl)-ammonium hydroxide, [4-(acryloylamino)butyl]-dimethyl-(6-sulfohexyl)-ammonium hydroxide, 2-(methacrylolyloxy)ethyl 2-(trimethylammonio)ethyl phosphate, 3-(methacrylolyloxy)propyl 2-(trimethylammonio)ethyl phosphate, 4-(methacrylolyloxy)butyl 2-(trimethylammonio)ethyl phosphate, 5-(methacrylolyloxy)pentyl 2-(trimethylammonio)ethyl phosphate, 6-(methacrylolyloxy)hexyl 2-(trimethylammonio)ethyl phosphate, 7-(methacrylolyloxy)heptyl 2-(trimethylammonio)ethyl phosphate, 8-(methacrylolyloxy)octyl 2-(trimethylammonio)ethyl phosphate, 2-(methacrylolylamino)ethyl 2-(trimethylammonio)ethyl phosphate, 3-(methacrylolylamino)propyl 2-(trimethylammonio)ethyl phosphate, 4-(methacrylolylamino)butyl 2-(trimethylammonio)ethyl phosphate, 5-(methacrylolylamino)pentyl 2-(trimethylammonio)ethyl phosphate, 6-(methacrylolylamino)hexyl 2-(trimethylammonio)ethyl phosphate, 7-(methacrylolylamino)heptyl 2-(trimethylammonio)ethyl phosphate, 8-(methacrylolylamino)octyl 2-(trimethylammonio)ethyl phosphate, 2-(acryloyloxy)ethyl 2-(trimethylammonio)ethyl phosphate, 3-(acryloyloxy)propyl 2-(trimethylammonio)ethyl phosphate, 4-(acryloyloxy)butyl 2-(trimethylammonio)ethyl phosphate, 5-(acryloyloxy)pentyl 2-(trimethylammonio)ethyl phosphate, 6-(acryloyloxy)hexyl 2-(trimethylammonio)ethyl phosphate, 7-(acryloyloxy)heptyl 2-(trimethylammonio)ethyl phosphate, 8-(acryloyloxy)octyl 2-(trimethylammonio)ethyl phosphate, 2-(methacrylolyloxy)ethyl 3-(trimethylammonio)propyl phosphate, 3-(methacrylolyloxy)propyl 3-(trimethylammonio)propyl phosphate, 4-(methacrylolyloxy)butyl 3-(trimethylammonio)propyl phosphate, 5-(methacrylolyloxy)pentyl 3-(trimethylammonio)propyl phosphate, 6-(methacrylolyloxy)hexyl 3-(trimethylammonio)propyl phosphate, 7-(methacrylolyloxy)heptyl 3-(trimethylammonio)propyl phosphate, 8-(methacrylolyloxy)octyl 3-(trimethylammonio)propyl phosphate, 2-(methacrylolylamino)ethyl 3-(trimethylammonio)propyl phosphate, 3-(methacrylolylamino)propyl 3-(trimethylammonio)propyl phosphate, 4-(methacrylolylamino)butyl 3-(trimethylammonio)propyl phosphate, 5-(methacrylolylamino)pentyl 3-(trimethylammonio)propyl phosphate, 6-(methacrylolylamino)hexyl 3-(trimethylammonio)propyl phosphate, 7-(methacrylolylamino)heptyl 3-(trimethylammonio)propyl phosphate, 8-(methacrylolylamino)octyl 3-(trimethylammonio)propyl phosphate, 2-(acryloyloxy)ethyl 3-(trimethylammonio)propyl phosphate, 3-(acryloyloxy)propyl 3-(trimethylammonio)propyl phosphate, 4-(acryloyloxy)butyl 3-(trimethylammonio)propyl phosphate, 5-(acryloyloxy)pentyl 3-(trimethylammonio)propyl phosphate, 6-(acryloyloxy)hexyl 3-(trimethylammonio)propyl phosphate, 7-(acryloyloxy)heptyl 3-(trimethylammonio)propyl phosphate, 8-(acryloyloxy)octyl 3-(trimethylammonio)propyl phosphate, 2-(methacrylolyloxy)ethyl 4-(trimethylammonio)butyl phosphate, 3-(methacrylolyloxy)propyl 4-(trimethylammonio)butyl phosphate, 4-(methacrylolyloxy)butyl 4-(trimethylammonio)butyl phosphate, 5-(methacrylolyloxy)pentyl 4-(trimethylammonio)butyl phosphate, 6-(methacrylolyloxy)hexyl 4-(trimethylammonio)butyl phosphate, 7-(methacrylolyloxy)heptyl 4-(trimethylammonio)butyl phosphate, 8-(methacrylolyloxy)octyl 4-(trimethylammonio)butyl phosphate, 2-(methacrylolylamino)ethyl 4-(trimethylammonio)butyl phosphate, 3-(methacrylolylamino)propyl 4-(trimethylammonio)butyl phosphate, 4-(methacrylolylamino)butyl 4-(trimethylammonio)butyl phosphate, 5-(methacrylolylamino)pentyl 4-(trimethylammonio)butyl phosphate, 6-(methacrylolylamino)hexyl 4-(trimethylammonio)butyl phosphate, 7-(methacrylolylamino)heptyl 4-(trimethylammonio)butyl phosphate, 8-(methacrylolylamino)octyl 4-(trimethylammonio)butyl phosphate, 2-(acryloyloxy)ethyl 4-(trimethylammonio)butyl phosphate, 3-(acryloyloxy)propyl 4-(trimethylammonio)butyl phosphate, 4-(acryloyloxy)butyl 4-(trimethylammonio)butyl phosphate, 5-(acryloyloxy)pentyl 4-(trimethylammonio)butyl phosphate, 6-(acryloyloxy)hexyl 4-(trimethylammonio)butyl phosphate, 7-(acryloyloxy)heptyl 4-(trimethylammonio)butyl phosphate, and 8-(acryloyloxy)octyl 4-(trimethylammonio)butyl phosphate.

The copolymer of the amphoteric ionic compound and the glycidyl (meth)acrylate may be formed by polymerizing an amphoteric ionic compound monomer with a glycidyl (meth)

acrylate monomer in the presence of an initiator. The amphoteric ionic compound and the glycidyl (meth)acrylate are preferably used by an equivalent ratio of 0.01 to 7:0.05 to 3.

The copolymer in exemplary embodiments may additionally include a poly(ethylene glycol) (meth)acrylate compound, along with the amphoteric ionic compound and the glycidyl (meth)acrylate. The poly(ethylene glycol) (meth)acrylate compound may include, without limitation, poly(ethylene glycol) methacrylate, poly(ethylene glycol) dimethacrylate, poly(ethylene glycol) methyl ether methacrylate, and a combination thereof. Preferably, both of poly(ethylene glycol) methacrylate and poly(ethylene glycol) dimethacrylate may be used together. When the poly(ethylene glycol) (meth)acrylate compound is added, the antifouling properties may be maximized.

Most preferably, the coating layer in exemplary embodiments may include a copolymer including the amphoteric ionic compound, glycidyl (meth)acrylate, poly(ethylene glycol) methacrylate and poly(ethylene glycol) dimethacrylate.

The method of manufacturing the reverse osmosis membrane in accordance with the present inventive concept may additionally include mixing the amphoteric ionic compound, glycidyl (meth)acrylate, poly(ethylene glycol) methacrylate and poly(ethylene glycol) dimethacrylate by an equivalent ratio of 0.1 to 7.5:0.01 to 5:0.1 to 5:0.01 to 1 and polymerizing. In this case, the polymerization may be preferably conducted at 40° C. to 80° C. for 0.1 to 10 hours. In this case, the polymerization process may not be limited to a certain process and may include radical polymerization. The copolymer prepared by the polymerization reaction may be a random copolymer. The copolymer may be preferably stored at a temperature of 0° C. or less, and may be readily used after defrosting at room temperature in order to restrain the reactivity of the glycidyl functional group included in the copolymer. When the copolymer is stored at room temperature, the glycidyl functional group may be easily hydrolyzed. In this case, a chemical bonding force of the coating layer with the polyamide active layer may be deteriorated.

Hereinafter, the present invention will be explained in more detail referring to preferred embodiments.

Preparation Example 1

Manufacture of Porous Support Including Polyamide Active Layer

Into an N,N-dimethylformamide (DMF) solution, 18 wt % of polysulfone as a solid content was added and dissolved at 80° C. for 12 hours or over to prepare a homogeneous liquid phase solution. The thus obtained solution was cast to have a thickness of 45 μm to 50 μm on a non-woven fabric of a polyester material having a thickness of 95 μm to 100 μm to manufacture a porous polysulfone support.

After dipping the thus manufactured porous polysulfone support into an aqueous solution including 2 wt % of metaphenylenediamine for 2 minutes and taking out, an excessive amount of the aqueous solution on the support was removed by using a 25 psi roller and dried at room temperature for 1 minute.

Then, the support was dipped into a 0.1 wt % of trimesoyl chloride organic solution using an ISOL-C (SK Chem) solvent for 1 minute, then removed, and dried in an oven at 60° C. for 10 minutes. After that, the support was washed in an aqueous solution of 0.2 wt % sodium carbonate at room temperature for 2 hours or longer, and washed using distilled water to manufacture a porous support having a polyamide active layer having a thickness of 200 nm.

Preparation Example 2

Preparation of Copolymer (A) Including Amphoteric Ionic Compound ((3-metacryloylamino)propyl)-dimethyl(3-sulfopropyl)-ammonium hydroxide, poly(ethylene glycol) methacrylate, and poly(ethylene glycol)dimethacrylate were mixed and reacted at 60° C. for 1 hour by radical polymerization using V-50 (Wako pure Chemicals Ind.) as an initiator. Immediately after that, glycidyl methacrylate was secondarily added to react at 60° C. for 1 hour again to obtain a four-element random copolymer including PGMA-PMPDSAH-PEGMA-PEGDMA. Here, PGMA represents polyglycidyl methacrylate, PMPDSAH represents poly((3-methacryloylamino)propyl)-dimethyl(3-sulfopropyl)-ammonium hydroxide, PEGMA represents poly(ethylene glycol) methacrylate, and PEGDMA represents poly(ethylene glycol) dimethacrylate. The copolymer was prepared by reacting PMPDSAH:PGMA:PEGMA:PEGDMA in an equivalent ratio of 5:2:3.9:0.1.

Example 1

The porous support including the polyamide active layer manufactured in Preparation Example 1 was washed using distilled water, was dipped into an aqueous solution including the copolymer prepared in Preparation Example 2 by 0.05 wt % for 1 minute, and was dried in an oven at 60° C. for 10 minutes to form a coating layer.

Example 2

A coating layer was formed by conducting the same procedure as described in Example 1 except for using an aqueous solution including 0.5 wt % of the copolymer.

Example 3

A coating layer was formed by conducting the same procedure as described in Example 1 except for using an aqueous solution including 1 wt % of the copolymer.

Example 4

A coating layer was formed by conducting the same procedure as described in Example 1 except for using an aqueous solution including 3 wt % of the copolymer.

Comparative Example

The support including the polyamide active layer manufactured in Preparation Example 1 was used after washing using distilled water without conducting any surface treatments for comparison.

Preparation Example 3

Preparation of Copolymer (B) Including Amphoteric Ionic Compound ((3-metacryloylamino)propyl)-dimethyl(3-sulfopropyl)-ammonium hydroxide was reacted at 60° C. for 1 hour by radical polymerization using V-50 (Wako pure Chemicals Ind.) as an initiator. Immediately after that, glycidyl methacrylate was secondly added and reacted again at 60° C. for 1 hour to obtain a two-element random copolymer including PGMA-PMPDSAH. Here, PGMA represents polyglycidyl methacrylate, and PMPDSAH represents poly((3-methacryloylamino)propyl)-dimethyl(3-sulfopropyl)-ammonium hydroxide. The copolymer was prepared by reacting PMPDSAH:PGMA in an equivalent ratio of 7:2.

Example 5

The porous support including the polyamide active layer manufactured in Preparation Example 1 was washed using distilled water, was dipped into an aqueous solution including the copolymer prepared in Preparation Example 3 by 0.05 wt % for 1 minute, and was dried in an oven at 60° C. for 10 minutes to form a coating layer.

Example 6

A coating layer was formed by conducting the same procedure as described in Example 5 except for using an aqueous solution including 0.5 wt % of the copolymer.

Example 7

A coating layer was formed by conducting the same procedure as described in Example 5 except for using an aqueous solution including 1 wt % of the copolymer.

Example 8

A coating layer was formed by conducting the same procedure as described in Example 5 except for using an aqueous solution including 3 wt % of the copolymer.

Preparation Example 4

Preparation of Copolymer (C) Including Amphoteric Ionic Compound (3-methacryloyloxy)propyl 3-(trimethylamonio)propyl phosphate, poly(ethylene glycol) methacrylate, and poly(ethylene glycol) dimethacrylate were mixed and reacted at 60° C. for 1 hour by radical polymerization using V-50 (Wako pure Chemicals Ind.) as an initiator. Immediately after that, glycidyl methacrylate was secondly added to react again at 60° C. for 1 hour to obtain a four-element random copolymer including PGMA-PMPTPP-PEGMA-PEGDMA. Here, PGMA represents polyglycidyl methacrylate, PMPTPP represents poly 3-(methacryloyloxy)propyl 3-(trimethylammonio)propyl phosphate, PEGMA represents poly(ethylene glycol) methacrylate, and PEGDMA represents poly(ethylene glycol) dimethacrylate. The copolymer was prepared by reacting PMPTPP:PGMA:PEGMA:PEGDMA in an equivalent ratio of 5:2:3.9:0.1.

Example 9

The porous support including the polyamide active layer manufactured in Preparation Example 1 was washed using distilled water, was dipped into an aqueous solution including the copolymer prepared in Preparation Example 4 by 0.05 wt % for 1 minute, and was dried in an oven at 60° C. for 10 minutes to form a coating layer.

Example 10

A coating layer was formed by conducting the same procedure as described in Example 9 except for using an aqueous solution including 0.5 wt % of the copolymer.

Example 11

A coating layer was formed by conducting the same procedure as described in Example 9 except for using an aqueous solution including 1 wt % of the copolymer.

Example 12

A coating layer was formed by conducting the same procedure as described in Example 9 except for using an aqueous solution including 3 wt % of the copolymer.

Preparation Example 5

Preparation of Copolymer (D) Including Amphoteric Ionic Compound (3-methacryloyloxy)propyl 3-(trimethylamonio)propyl phosphate was reacted at 60° C. for 1 hour by radical polymerization using V-50 (Wako pure Chemicals Ind.) as an initiator. Immediately after that, glycidyl methacrylate was secondly added to react again at 60° C. for 1 hour to obtain a two-element random copolymer including PGMA-PMPTPP. Here, PGMA represents polyglycidyl methacrylate, PMPTPP represents poly 3-(methacryloyloxy)propyl 3-(trimethylammonio)propyl phosphate. The copolymer was prepared by reacting PMPTPP:PGMA in an equivalent ratio of 7:2.

Example 13

The porous support including the polyamide active layer manufactured in Preparation Example 1 was washed using distilled water, was dipped into an aqueous solution including the copolymer prepared in Preparation Example 5 by 0.05 wt % for 1 minute, and was dried in an oven at 60° C. for 10 minutes to form a coating layer.

Example 14

A coating layer was formed by conducting the same procedure as described in Example 13 except for using an aqueous solution including 0.5 wt % of the copolymer.

Example 15

A coating layer was formed by conducting the same procedure as described in Example 13 except for using an aqueous solution including 1 wt % of the copolymer.

Example 16

A coating layer was formed by conducting the same procedure described as in Example 13 except for using an aqueous solution including 3 wt % of the copolymer.

Experiment 1

Evaluation on Water Purifying Performance

The initial salt rejection and the initial permeation flux of the reverse osmosis membranes manufactured in Examples 1 to 16 and the Comparative Example were measured. The initial salt rejection and the initial permeation flux were measured while supplying an aqueous sodium chloride solution of 32,000 ppm with a flowing rate of 1,400 mL/min at 25° C. A reverse osmosis membrane cell apparatus used for the evaluation on the membrane includes a flat type transmission cell, a high pressure pump, a storing bath and a cooling apparatus. The structure of the flat type transmission cell was cross-flow type, and an effective transmission area was 140 cm². After installing a washed reverse osmosis membrane onto the transmission cell, a preliminary operation was sufficiently conducted for about 1 hour by using thirdly distilled water to stabilize the evaluation apparatus. Then, the aqueous sodium chloride solution of 32,000 ppm was supplied, and an apparatus operation was conducted for about 1 hour until the pressure and the permeation flux reached a stationary state. Then, the amount of water transmitted for 10 minutes was measured, and the flux was calculated. The salt rejection was calculated by analyzing the concentration of the salt before and after the transmission by using a conductivity meter. The measured results are illustrated in following Table 1.

TABLE 1

| | Initial salt rejection (%) | Initial permeation flux (gallon/ft² · day) |
|---|---|---|
| Example 1 | 97.94 | 27.94 |
| Example 2 | 98.78 | 29.97 |
| Example 3 | 98.54 | 29.63 |
| Example 4 | 98.23 | 29.31 |
| Example 5 | 97.84 | 27.99 |
| Example 6 | 98.59 | 29.72 |
| Example 7 | 98.43 | 29.21 |
| Example 8 | 98.31 | 29.09 |
| Example 9 | 97.75 | 27.98 |
| Example 10 | 98.17 | 29.46 |
| Example 11 | 98.23 | 29.32 |
| Example 12 | 98.31 | 29.25 |
| Example 13 | 97.91 | 27.99 |
| Example 14 | 98.23 | 29.48 |
| Example 15 | 98.28 | 29.17 |
| Example 16 | 98.32 | 28.87 |
| Comparative Example | 97.79 | 27.96 |

Experiment 2

Evaluation on Antifouling Properties

The antifouling properties of the reverse osmosis membranes manufactured in Examples 1 to 16 and Comparative Example were evaluated. The evaluation of the antifouling properties was conducted by using a mixture solution of an aqueous NaCl solution of 32,000 ppm and an aqueous casein solution of 100 ppm at a pressure of 800 psi. After evaluating the initial salt rejection and the initial permeation flux, the aqueous casein solution of 100 ppm was inserted into an evaluation tank. Immediately after, the salt rejection and the flux change were measured. After 2 hours, the salt rejection and the flux change were measured. The casein was used after dissolving into an aqueous solution of pH of 11 or over. The measured results are illustrated in Table 2.

TABLE 2

| | Initial flux immediately after adding casein | Initial flux after 2 hours of adding casein | Salt rejection immediately after adding casein | Salt rejection after 2 hours of adding casein |
|---|---|---|---|---|
| Example 1 | 27.24 | 23.42 | 97.81 | 98.21 |
| Example 2 | 30.08 | 29.88 | 98.54 | 99.34 |
| Example 3 | 28.94 | 27.74 | 98.43 | 99.09 |
| Example 4 | 28.14 | 26.97 | 98.64 | 98.89 |
| Example 5 | 27.13 | 23.54 | 97.77 | 98.13 |
| Example 6 | 29.32 | 29.00 | 98.64 | 99.19 |
| Example 7 | 28.75 | 27.98 | 98.51 | 99.01 |
| Example 8 | 28.34 | 26.99 | 98.72 | 98.85 |
| Example 9 | 27.38 | 23.37 | 97.82 | 98.19 |
| Example 10 | 29.45 | 29.89 | 98.58 | 99.05 |
| Example 11 | 28.30 | 27.70 | 98.60 | 99.02 |
| Example 12 | 28.08 | 26.89 | 98.57 | 98.91 |
| Example 13 | 27.09 | 23.31 | 97.88 | 98.05 |
| Example 14 | 29.88 | 29.34 | 98.44 | 99.14 |
| Example 15 | 28.68 | 27.44 | 98.47 | 99.04 |
| Example 16 | 28.11 | 26.86 | 98.60 | 98.91 |
| Comparative Example | 26.98 | 22.93 | 97.41 | 98.18 |

Experiment 3

The antifouling properties of the reverse osmosis membrane manufactured in Example 2 was measured by using a mixture solution of an aqueous NaCl solution of 32,000 ppm and an aqueous casein solution of 300 ppm. The results are illustrated in Table 3.

TABLE 3

| | Initial flux immediately after adding casein | Initial flux after 2 hours from adding casein | Salt rejection immediately after adding casein | Salt rejection after 2 hours from adding casein |
|---|---|---|---|---|
| Example 2 | 31.12 | 29.12 | 98.44 | 99.28 |
| Comparative Example | 26.28 | 22.03 | 97.32 | 98.07 |

The reverse osmosis membrane in exemplary embodiments has an equivalent or better water purifying function and good antifouling properties as compared to a common reverse osmosis membrane. In addition, since the coating layer in exemplary embodiments makes a chemical bond with a polyamide layer on the surface of the reverse osmosis membrane, the coating layer may not be delaminated and may have a good durability.

While the present invention has been shown and described in connection with the embodiments, it will be apparent to those skilled in the art that modifications and variations can be made without departing from the spirit and scope of the invention as defined by the appended claims.

What is claimed is:
1. A reverse osmosis membrane, comprising:
a porous support;
a polyamide active layer formed on the porous support; and
a coating layer including a copolymer including an amphoteric ionic compound and a glycidyl (meth)acrylate, the coating layer making a chemical bond with the polyamide active layer; wherein the amphoteric ionic compound comprises one or more groups selected from the groups consisting of an ammonium group, a phosphonium group, a sulfonic acid group, a phosphate group and an acetate group.

2. The reverse osmosis membrane of claim 1, wherein the amphoteric ionic compound is a compound represented by following Chemical Formula 1 or a compound represented by following Chemical Formula 2,

[Chemical Formula 1]

[Chemical Formula 2]

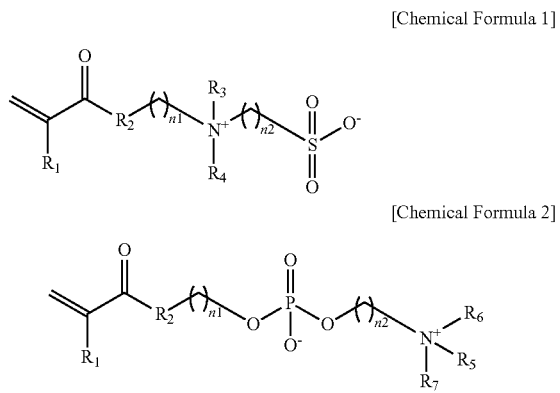

in Chemical Formulae 1 and 2, $R_1$ represents H or a $C_{1-10}$ alkyl group, $R_2$ represents O, NH, S or PH, each of $R_3$, $R_4$, $R_5$, $R_6$ and $R_7$ independently represents hydrogen or a $C_{2-5}$ alkyl group, $n_1$ represents an integer of 1 to 8, and $n_2$ represents an integer of 1 to 4.

3. The reverse osmosis membrane of claim 1, wherein the amphoteric ionic compound is at least one selected from the group consisting of [2-(methacrylolyloxy)ethyl]-dimethyl-(2-sulfoethyl)-ammonium hydroxide, [2-(methacrylolyloxy)ethyl]-dimethyl-(3-sulfopropyl)-ammonium hydroxide, [2-(methacrylolyloxy)ethyl]-dimethyl-(4-sulfobutyl)-ammonium hydroxide, [2-(methacrylolyloxy)ethyl]-dimethyl-(5-sulfopentyl)-ammonium hydroxide, [2-(acryloyloxy)ethyl]-dimethyl-(2-sulfoethyl)-ammonium hydroxide, [2-(acryloyloxy)ethyl]-dimethyl-(3-sulfopropyl)-ammonium hydroxide, [2-(acryloyloxy)ethyl]-dimethyl-(4-sulfobutyl)-ammonium hydroxide, [2-(acryloyloxy)ethyl]-dimethyl-(5-sulfopentyl)-ammonium hydroxide, [3-(methacrylolyloxy)propyl]-dimethyl-(2-sulfoethyl)-ammonium hydroxide, [3-(methacrylolyloxy)propyl]-dimethyl-(3-sulfopropyl)-ammonium hydroxide, [3-(methacrylolyloxy)propyl]-dimethyl-(4-sulfobutyl)-ammonium hydroxide, [3-(methacrylolyloxy)propyl]-dimethyl-(5-sulfopentyl)-ammonium hydroxide, [3-(acryloyloxy)propyl]-dimethyl-(2-sulfoethyl)-ammonium hydroxide, [3-(acryloyloxy)propyl]-dimethyl-(3-sulfopropyl)-ammonium hydroxide, [3-(acryloyloxy)propyl]-dimethyl-(4-sulfobutyl)-ammonium hydroxide, [3-(acryloyloxy)propyl]-dimethyl-(5-sulfopentyl)-ammonium hydroxide, [4-(methacrylolyloxy)butyl]-dimethyl-(2-sulfoethyl)-ammonium hydroxide, [4-(methacrylolyloxy)butyl]-dimethyl-(3-sulfopropyl)-ammonium hydroxide, [4-(methacrylolyloxy)butyl]-dimethyl-(4-sulfobutyl)-ammonium hydroxide, [4-(methacrylolyloxy)butyl]-dimethyl-(5-sulfopentyl)-ammonium hydroxide, [4-(methacrylolyloxy)butyl]-dimethyl-(6-sulfohexyl)-ammonium hydroxide, [4-(acryloyloxy)butyl]-dimethyl-(2-sulfoethyl)-ammonium hydroxide, [4-(acryloyloxy)butyl]-dimethyl-(3-sulfopropyl)-ammonium hydroxide, [4-(acryloyloxy)butyl]-dimethyl-(4-sulfobutyl)-ammonium hydroxide, [4-(acryloyloxy)butyl]-dimethyl-(5-sulfopentyl)-ammonium hydroxide, [4-(acryloyloxy)butyl]-dimethyl-(6-sulfohexyl)-ammonium hydroxide, [2-(methacrylolylamino)ethyl]-dimethyl-(2-sulfoethyl)-ammonium hydroxide, [2-(methacrylolylamino)ethyl]-dimethyl-(3-sulfopropyl)-ammonium hydroxide, [2-(methacrylolylamino)ethyl]-dimethyl-(4-sulfobutyl)-ammonium hydroxide, [2-(methacrylolylamino)ethyl]-dimethyl-(5-sulfopentyl)-ammonium hydroxide, [2-(acryloylamino)ethyl]-dimethyl-(2-sulfoethyl)-ammonium hydroxide, [2-(acryloylamino)ethyl]-dimethyl-(3-sulfopropyl)-ammonium hydroxide, [2-(acryloylamino)ethyl]-dimethyl-(4-sulfobutyl)-ammonium hydroxide, [2-(acryloylamino)ethyl]-dimethyl-(5-sulfopentyl)-ammonium hydroxide, [3-(methacrylolylamino)propyl]-dimethyl-(2-sulfoethyl)-ammonium hydroxide, [3-(methacrylolylamino)propyl]-dimethyl-(3-sulfopropyl)-ammonium hydroxide, [3-(methacrylolylamino)propyl]-dimethyl-(4-sulfobutyl)-ammonium hydroxide, [3-(methacrylolylamino)propyl]-dimethyl-(5-sulfopentyl)-ammonium hydroxide, [3-(acryloylamino)propyl]-dimethyl-(2-sulfoethyl)-ammonium hydroxide, [3-(acryloylamino)propyl]-dimethyl-(3-sulfopropyl)-ammonium hydroxide, [3-(acryloylamino)propyl]-dimethyl-(4-sulfobutyl)-ammonium hydroxide, [3-(acryloylamino)propyl]-dimethyl-(5-sulfopentyl)-ammonium hydroxide, [4-(methacrylolylamino)butyl]-dimethyl-(2-sulfoethyl)-ammonium hydroxide, [4-(methacrylolylamino)butyl]-dimethyl-(3-sulfopropyl)-ammonium hydroxide, [4-(methacrylolylamino)butyl]-dimethyl-(4-sulfobutyl)-ammonium hydroxide, [4-(methacrylolylamino)butyl]-dimethyl-(5-sulfopentyl)-ammonium hydroxide, [4-(methacrylolylamino)butyl]-dimethyl-(6-sulfohexyl)-ammonium hydroxide, [4-(acryloylamino)butyl]-dimethyl-(2-sulfoethyl)-ammonium hydroxide, [4-(acryloylamino)butyl]-dimethyl-(3-sulfopropyl)-ammonium hydroxide, [4-(acryloylamino)butyl]-dimethyl-(4-sulfobutyl)-ammonium hydroxide, [4-(acryloylamino)butyl]-dimethyl-(5-sulfopentyl)-ammonium hydroxide, [4-(acryloylamino)butyl]-dimethyl-(6-sulfohexyl)-ammonium hydroxide, 2-(methacrylolyloxy)ethyl 2-(trimethylammonio)ethyl phosphate, 3-(methacrylolyloxy)propyl 2-(trimethylammonio)ethyl phosphate, 4-(methacrylolyloxy)butyl 2-(trimethylammonio)ethyl phosphate, 5-(methacrylolyloxy)pentyl 2-(trimethylammonio)ethyl phosphate, 6-(methacrylolyloxy)hexyl 2-(trimethylammonio)ethyl phosphate, 7-(methacrylolyloxy)heptyl 2-(trimethylammonio)ethyl phosphate, 8-(methacrylolyloxy)octyl 2-(trimethylammonio)ethyl phosphate, 2-(methacrylolylamino)ethyl 2-(trimethylammonio)ethyl phosphate, 3-(methacrylolylamino)propyl 2-(trimethylammonio)ethyl phosphate, 4-(methacrylolylamino)butyl 2-(trimethylammonio)ethyl phosphate, 5-(methacrylolylamino)pentyl 2-(trimethylammonio)ethyl phosphate, 6-(methacrylolylamino)hexyl 2-(trimethylammonio)ethyl phosphate, 7-(methacrylolylamino)heptyl 2-(trimethylammonio)ethyl phosphate, 8-(methacrylolylamino)octyl 2-(trimethylammonio)ethyl phosphate, 2-(acryloyloxy)ethyl 2-(trimethylammonio)ethyl phosphate, 3-(acryloyloxy)propyl 2-(trimethylammonio)ethyl phosphate, 4-(acryloyloxy)butyl 2-(trimethylammonio)ethyl phosphate, 5-(acryloyloxy)pentyl 2-(trimethylammonio)ethyl phosphate, 6-(acryloyloxy)hexyl 2-(trimethylammonio)ethyl phosphate, 7-(acryloyloxy)heptyl 2-(trimethylammonio)ethyl phosphate, 8-(acryloyloxy)octyl 2-(trimethylammonio)ethyl phosphate, 2-(methacrylolyloxy)ethyl 3-(trimethylammonio)propyl phosphate, 3-(methacrylolyloxy)propyl 3-(trimethylammonio)propyl phosphate, 4-(methacrylolyloxy)butyl 3-(trimethylammonio)propyl phosphate, 5-(methacrylolyloxy)pentyl 3-(trimethylammonio)propyl phosphate, 6-(methacrylolyloxy)hexyl 3-(trimethylammonio)propyl phosphate, 7-(methacrylolyloxy)heptyl 3-(trimethylammonio)propyl phosphate, 8-(methacrylolyloxy)octyl 3-(trimethylammonio)propyl phosphate, 2-(methacrylolylamino)ethyl 3-(trimethylammonio)propyl phosphate, 3-(methacrylolylamino)propyl 3-(trimethylammonio)propyl phosphate, 4-(methacrylolylamino)butyl 3-(trimethylammonio)propyl phosphate, 5-(methacrylolylamino)pentyl 3-(trimethylammonio)propyl phosphate, 6-(methacrylolylamino)hexyl 3-(trimethylammonio)propyl phosphate, 7-(methacrylolylamino)heptyl 3-(trimethylammonio)propyl phosphate, 8-(methacrylolylamino)octyl 3-(trimethylammonio)propyl phosphate, 2-(acryloyloxy)ethyl 3-(trimethylammonio)propyl phosphate, 3-(acryloyloxy)propyl 3-(trimethylammonio)propyl phosphate, 4-(acryloyloxy)butyl 3-(trimethylammonio)propyl phosphate, 5-(acryloyloxy)pentyl 3-(trimethylammonio)propyl phosphate, 6-(acryloyloxy)hexyl 3-(trimethylammonio)propyl phosphate, 7-(acryloyloxy)heptyl 3-(trimethylammonio)propyl phosphate, 8-(acryloyloxy)octyl 3-(trimethylammonio)propyl phosphate, 2-(methacrylolyloxy)ethyl 4-(trimethylammonio)butyl phosphate, 3-(methacrylolyloxy)propyl 4-(trimethylammonio)butyl phosphate, 4-(methacrylolyloxy)butyl 4-(trimethylammonio)butyl phosphate, 5-(methacrylolyloxy)pentyl 4-(trimethylammonio)butyl phosphate, 6-(methacrylolyloxy)hexyl 4-(trimethylammonio)butyl phosphate, 7-(methacrylolyloxy)heptyl 4-(trimethylammonio)butyl phosphate, 8-(methacrylolyloxy)octyl 4-(trimethylammonio)butyl phosphate, 2-(methacrylolylamino)ethyl 4-(trimethylammonio)butyl phosphate, 3-(methacrylolylamino)propyl 4-(trimethylammonio)butyl phosphate, 4-(methacrylolylamino)butyl 4-(trimethylammonio)butyl phosphate, 5-(methacrylolylamino)pentyl 4-(trimethylammonio)butyl phosphate, 6-(methacrylolylamino)hexyl 4-(trimethylammonio)butyl phosphate, 7-(methacrylolylamino)heptyl 4-(trimethylammonio)butyl phosphate, 8-(methacrylolylamino)octyl 4-(trimethylammonio)butyl phosphate, 2-(acryloyloxy)ethyl 4-(trimethylammonio)butyl phosphate, 3-(acryloyloxy)propyl 4-(trimethylammonio)butyl phosphate, 4-(acryloyloxy)butyl 4-(trimethylammonio)butyl phosphate, 5-(acryloyloxy)pentyl 4-(trimethylammonio)butyl phosphate, 6-(acryloyloxy)hexyl 4-(trimethylammonio)butyl phosphate, 7-(acryloyloxy)heptyl 4-(trimethylammonio)butyl phosphate, and 8-(acryloyloxy)octyl 4-(trimethylammonio)butyl phosphate.

4. The reverse osmosis membrane of claim 1, wherein the copolymer is prepared by reacting the amphoteric ionic compound and glycidyl (meth)acrylate by an equivalent ratio of 0.01 to 7:0.05 to 3.

5. The reverse osmosis membrane of claim 1, wherein the copolymer further comprises ethylene glycol (meth)acrylate compound.

6. The reverse osmosis membrane of claim 5, wherein the ethylene glycol (meth)acrylate compound is at least one selected from the group consisting of polyethylene glycol methacrylate, polyethylene glycol dimethacrylate and poly(ethylene glycol) methyl ether methacrylate.

7. The reverse osmosis membrane of claim 1, wherein the coating layer includes a copolymer including the amphoteric ionic compound, glycidyl (meth)acrylate, poly(ethylene glycol) methacrylate and poly(ethylene glycol) dimethacrylate.

8. The reverse osmosis membrane of claim 6, wherein the copolymer is prepared by reacting the amphoteric ionic compound, glycidyl (meth)acrylate, poly(ethylene glycol) methacrylate and poly(ethylene glycol) dimethacrylate by an equivalent ratio of 0.1 to 7.5:0.01 to 5:0.1 to 5:0.01 to 1.

9. The reverse osmosis membrane of claim 1, wherein the reverse osmosis membrane has a salt rejection after 2 hours from an introduction of casein of 97% or more, and has a permeation flux of 23 to 25 gallon/ft$^2$·day.

10. A method of manufacturing a reverse osmosis membrane, comprising forming a coating layer by treating a porous support including a polyamide active layer with an aqueous solution including a copolymer including an amphoteric ionic compound and glycidyl (meth)acrylate; wherein the amphoteric ionic compound comprises one or more groups selected from the groups consisting of an ammonium group, a phosphonium group, a sulfonic acid group, a phosphate group and an acetate group.

11. The method of manufacturing a reverse osmosis membrane of claim 10, wherein the aqueous solution comprises the copolymer by 0.0001 wt % to 10 wt %.

12. The method of manufacturing a reverse osmosis membrane of claim 10, wherein the treating is conducted by a dipping process.

13. The method of manufacturing a reverse osmosis membrane of claim 12, wherein the dipping process is conducted for 1 minute to 5 hours.

14. The method of manufacturing a reverse osmosis membrane of claim 10, wherein the copolymer additionally comprises at least one of poly(ethylene glycol) methacrylate and poly(ethylene glycol) dimethacrylate.

15. The method of manufacturing a reverse osmosis membrane of claim 10, further comprising preparing the copolymer by mixing the amphoteric ionic compound, glycidyl (meth)acrylate, poly(ethylene glycol) methacrylate and poly(ethylene glycol) dimethacrylate by an equivalent ratio of 0.1 to 7.5:0.01 to 5:0.1 to 5:0.01 to 1 and polymerizing.

16. The method of manufacturing a reverse osmosis membrane of claim 10, further comprising drying at 25 to 65° C. for 1 to 30 minutes after forming the coating layer.

\* \* \* \* \*